(No Model.) 2 Sheets—Sheet 1.
A. WEATHERBY.
LATHE CHUCK.
No. 498,998. Patented June 6, 1893.
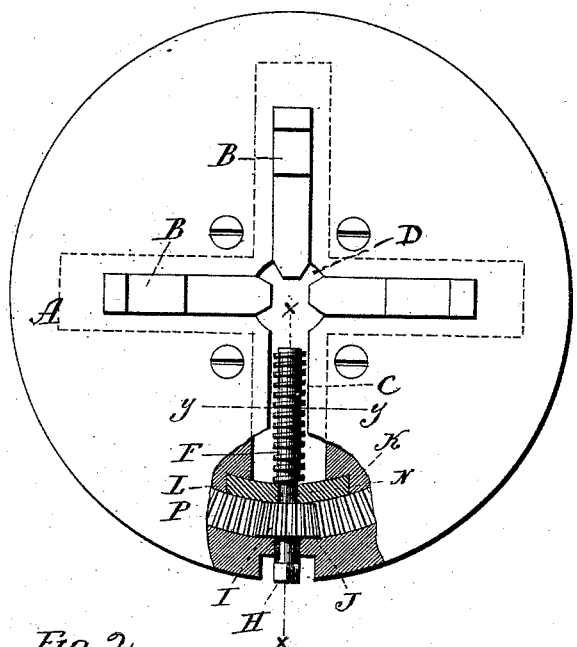
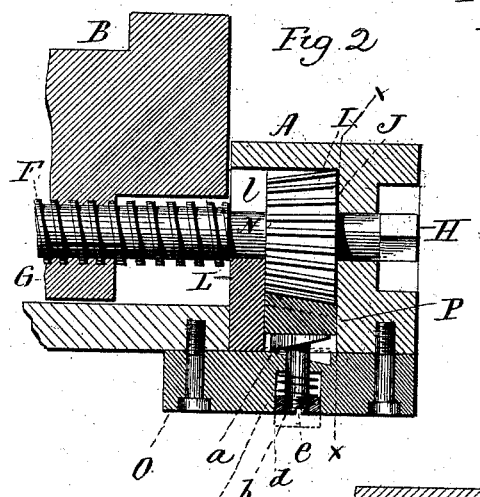
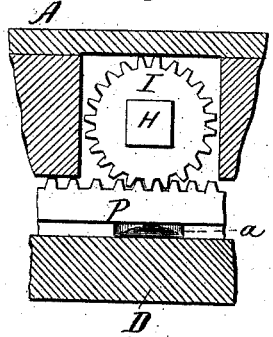
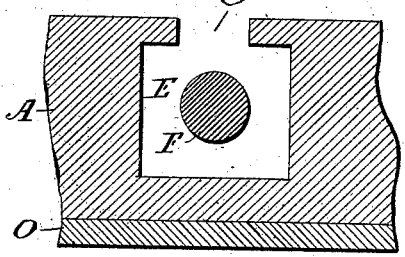
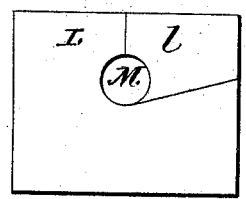
Witnesses
J. H. Shumway
Lillian D. Kelsey
Aaron Weatherby
Inventor
By atty
Earle Seymour (No Model.)  2 Sheets—Sheet 2.

A. WEATHERBY.
LATHE CHUCK.

No. 498,998. Patented June 6, 1893.

UNITED STATES PATENT OFFICE.

AARON WEATHERBY, OF NEW HAVEN, CONNECTICUT.

LATHE-CHUCK.

SPECIFICATION forming part of Letters Patent No. 498,998, dated June 6, 1893.

Application filed March 7, 1892. Serial No. 424,021. (No model.)

*To all whom it may concern:*

Be it known that I, AARON WEATHERBY, of New Haven, in the county of New Haven and State of Connecticut, have invented a new Improvement in Lathe-Chucks; and I do hereby declare the following, when taken in connection with accompanying drawings and the letters of reference marked thereon, to be a full, clear, and exact description of the same, and which said drawings constitute part of this specification, and represent, in—

Figure 6:
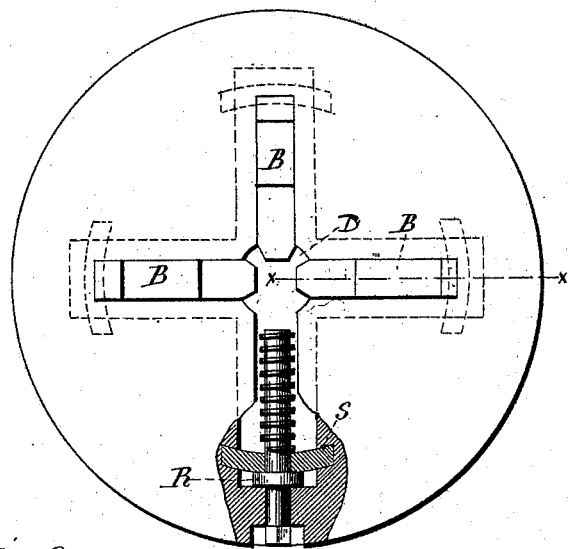
Figure 8:
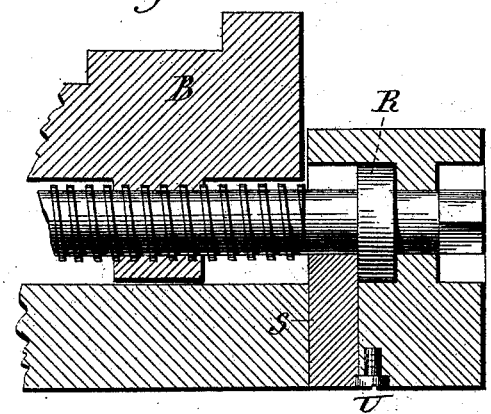
Figure 7:
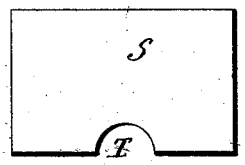
Figure 9:
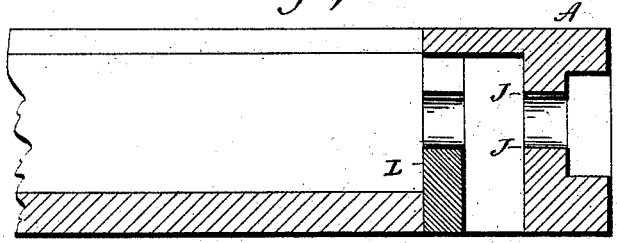

Figure 1, a face view of the chuck in partial section; Fig. 2, a diametrical section cutting on line $x$—$x$ of Fig. 1; Fig. 3, a transverse section cutting on line $x$—$x$ of Fig. 2; Fig. 4, a transverse section on line $y$—$y$ of Fig. 1; Fig. 5, one of the blocks detached; Fig. 6, a face view of a modified form of the chuck; Fig. 7, a diametrical section on line $x$—$x$ of Fig. 6; Fig. 8, a modified form of block; Fig. 9, a broken view in vertical section on the line $x$—$x$ of Fig. 1, showing the chuck body with all of the parts designed to be associated with it removed, except one of the two-part retaining-blocks, and clearly representing the extension of the recesses in the block beyond the outer ends of the slots therein.

This invention relates to an improvement in that class of lathe-chucks in which several jaws are arranged to move radially, and the jaws each adjusted by a radial leading-screw arranged in the head. The jaws in such chucks being movable, it is necessary that the screw shall be held longitudinally stationary in the head while permitted to revolve, and so as to form leading-screws by which the respective jaws may be moved. It is frequently necessary to detach the jaws from the head as for repairs, or for changing one style of jaws for another. Such removal of the jaws or change, also necessitates the removal of the screws. In this class of chucks in some cases the screws are each operated independently by the application of a wrench to the head of the screw which projects through the periphery; in other cases the screws are each provided with a pinion, and a rotating rack is arranged in the head of the chuck, and so that the application of a wrench to the head of one screw will simultaneously and correspondingly operate all the screws, so that the several jaws will move simultaneously.

In the case of the employment of the pinions on the screws, whereby the simultaneous action of all the screws is produced, the heads of the chuck have usually been divided in a plane at right angles to the axis of the screws, and so that the bearings for the screws will be formed in each part, suitable recesses being formed to receive the pinions. This division has been necessary for the introduction or removal of the screws with their pinions.

The object of my invention is a simple construction, whereby the screws are firmly held in place in the head, yet readily removed as occasion may require, and the invention consists in the construction as hereinafter described and particularly recited in the claims.

A, represents the disk like head of a chuck. B, represents the several jaws, which are arranged in radial grooves or slots C, all running to a central opening D in the face of the chuck, the jaws being adapted to slide toward and from the center, as usual in this class of chucks. The grooves are under-cut within the head, so as to form an enlarged radial recess E, see Fig. 4, inside the grooves, and which recesses also run to the center, as indicated in broken lines Fig. 1. At their outer ends the said recesses extend beyond the slots, as shown by Figs. 1, 2 and 9 of the drawings, and terminate in transverse shoulders or abutments J, formed by the body of the chuck. Within each of the recesses E, the several screws F are arranged radially, the jaws being each provided with a projection G, which forms the nuts through which the screws work. One or more of the screws extend outward through the periphery of the head, and terminate in angular shaped heads H, to which a wrench may be applied to rotate the screws, and so as to produce the required radial movement of the jaws. Each screw is provided with a pinion I, near its outer end, these pinions being of a diameter less than the width or depth of the grooves E, and at the outer ends of the grooves a shoulder J, is formed, against which the outer end of the pinion may rest, as seen in Figs. 1 and 2 as a collar to resist the outward thrust of the screw. In the head on the rear side an annular groove K, is cut, in a plane just inside the inner ends of the pinions. This groove is shown in broken lines Fig. 1. Into these grooves a block L, is set over the neck of each screw and against the inner ends of the pinions. The blocks are constructed as seen in Fig. 5. The extension of the recesses E, beyond the outer ends of the slots C, as before mentioned, makes room for the accommodation of the pinions I, and blocks J of the respective leading-screws. Through the block is an opening M, which corresponds in diameter to the necks N, of the screws, and the block is divided into two parts $l$, representing the second part; the blocks thus divided one part as $l$ is first set into the groove K against the neck of the screw from one side, and then the other part L is set in the groove against the other side of the neck. The depth of the block corresponds to the depth of the groove K, and so that when inserted, its outer edge will stand substantially flush with the rear surface of the head of the chuck, and then a plate O, secured upon the back of the chuck, see Fig. 2, over the block will secure the block in place. To interlock the two parts of the block so as to prevent lateral movement, the division between the two parts is made angular, as seen in Fig. 5, so that the main body of the block will so overlap the part $l$ as to hold the two parts together against lateral movement. The length of the blocks L, is greater than the width of the recesses E, as seen in Fig. 1. Hence when the blocks are inserted, they practically close the outer end of the recess, and so separate that recess from the pinion that chips or other foreign substance cannot pass into the recess in which the pinions stand. The grooves into which the block L, is inserted are made so much wider than the thickness of the block as the length of the pinions, and into the groove outside the block L, a toothed concentric rack P is placed, as seen in Figs. 1, 2 and 3, this rack being toothed corresponding to the pinions on the screws, and so as to engage the pinions of all the screws. The same plate O, which holds the block L, serves to hold the rack P. The rack is free to rotate in its groove. Consequently if one of the screws be turned, the pinion will communicate that rotation of the screw to the rack, and through the rack simultaneously to all the other screws. This arrangement of rack and pinion whereby simultaneous action of all the screws is produced, is a common and well known device. By this construction of the head, that is, constructing the head solid and with the recesses E, extending outward toward the periphery of the head, and of a size corresponding to the size of the pinions, the screws with their pinions may be introduced without a transverse division of the head, as before described. The opening D, into the center of the head, is so large that the pinion may pass in through that opening. To introduce the screws, they are first set into the groove opposite that which they are to occupy with the pinion, so that it may pass through the opening D, into the recess below. Then the screws are moved longitudinally through their own recess, until their proper position is reached, the jaws being applied in the usual manner.

In a chuck of the class in which the screws are each independent, that is the rack and the pinions omitted, the construction is made as seen in Figs. 6 and 7, the screw being constructed with an annular collar R, which occupies a position in the head of the chuck substantially the same as does the pinion in the first illustration. Instead of making the blocks as first described they may be made in a single piece, as seen at S. Fig. 8. In this case the block is constructed with a notch T, on one side, adapted to embrace the neck of the screw, and the block is inserted into the groove so that the notch will set over the neck of the screw, and instead of securing the block by means of a plate, as first described, a single screw U, as seen in Fig. 7, may be introduced, to engage the block when in place. At any time when it is desired to remove the jaws, in either case, the block of the particular screw is withdrawn, and then the screw drawn inward until the collar reaches the opening in the center, when it may be lifted bodily from the head.

It is many times desirable to readjust the jaws with relation to each other, or to set them at varying distances from the center, and also it is necessary to withdraw the rack from the pinions before the screws with the pinions can be drawn inward from the bearing in the head. To accomplish this object, chucks have been made with the rack arranged so as to be withdrawn from engagement with the pinions, so that they may be readjusted, and then the rack reset. To produce this disengagement of the rack, screws have been introduced from the rear of the chuck to bear against the rack, and so as to force and hold it into engagement with the pinions, and then by withdrawing the screws, the rack would move away from and out of engagement with the pinions. As a simple and convenient means for thus operating the rack, and avoid the several revolutions of the screw which are necessary, the rack P, is supported upon cams $a$. These cams are of circular shape, and are constructed with a spindle $b$, which extends through the rear portion of the chuck, and which, as here represented, is the plate O, the spindle forming an axis upon which the cam may rotate. The inner face of the plate around the spindle opening and directly back of the cam is inclined from one side toward the opposite side, and the face of the cam is correspondingly beveled or inclined as clearly seen in Fig. 2. The outside of the plate around the spindle is recessed to form a chamber for a spring $c$, and on the outer end of the spindle a nut $d$, is applied, of a diameter corresponding to the spring-chamber, and so that the spring will bear against the bottom of the spring-chamber at one end, and the other end will bear against the nut or collar *d*, the tendency of the spring being to draw the cam outward onto its seat. The outer end of the spindle is constructed with a nick *e* for the application of a screw-driver, so as to impart rotation to the cam. The bevel or inclined surfaces between the cam and the plate are equal to the extent of movement required for the rack P. Normally the cam stands as seen in Fig. 2, so as to support and hold the rack in engagement with the pinion, but if the cam be turned one half a revolution, as indicated in broken lines Fig. 2, the cam will recede from the rack, and so as to permit the rack to drop away from the pinions, as also indicated in broken lines Fig. 2, and so as to leave the screws with their jaws and pinions free for removal or re-adjustment. When the pinions are replaced, the rack is thrown into engagement with the pinions by returning the cams. The cam-surfaces permit the adjustment of the rack with relation to the pinions should such adjustment be necessary.

I am aware that the use of several cams to lift the rack into, or let it fall out of, engagement with the pinions is old, and I do not therefore claim that construction broadly.

I claim—

1. In a lathe-chuck, the combination with the body thereof, constructed with radial slots formed in its front face, and with corresponding recesses located under and extended outward beyond the outer ends of the said slots which open into them, and terminating at their said outer ends in the transverse walls or abutments formed in the chuck-body; of jaws located in the said slots, and each constructed with a nut extending into the recess below the slot, leading-screws located in the said recesses and passing through the said nuts, one or more of the said screws extending outward through the periphery of the chuck-body, an annular projection located upon each screw to bear against the wall or abutment at the outer end of the recess containing the screw, and retaining-blocks set into the body to enter the said recesses at a point in front of the inner faces of the projections of the screws which are thus held in place against endwise movement, substantially as described.

2. In a lathe-chuck, the combination with the chuck-body constructed with radial slots formed in its front face, and with corresponding recesses located under and extended outward beyond the outer ends of the said slots which open into them, and terminating at their said outer ends in transverse walls or abutments formed in the chuck-body; of jaws located in the said slots, and each constructed with a nut extending into the recess below the slot, leading-screws located in the said recesses, and passing through the said nuts, one or more of the screws extending outward through the periphery of the head; pinions mounted upon the outer ends of the respective screws, located in the extreme outer ends of the said recesses, and abutting against the said transverse walls; a circular rack for engagement with the said pinions, and removable retaining blocks located in slots formed in the chuck-body, and engaging with the inner faces of the pinions, the said slots extending transversely to the said recesses into which they open, substantially as set forth.

3. In a chuck consisting of a head having longitudinal grooves, with jaws arranged in said grooves, and radial leading-screws by which said jaws are moved, the combination therewith of the removable block L for each of said screws, the said block having an opening through it corresponding to the neck of the screw, and the block divided from the opening, the lines of division being angular, whereby the two parts are interlocked, substantially as and for the purpose described.

4. In a lathe-chuck, the combination with the body thereof, of jaws mounted therein for radial movement, a leading-screw for each jaw, a pinion mounted upon the outer end of each screw, an annular rack taking into the several pinions, and movable toward and away from the same, a plate secured to the back of the chuck-head, and constructed upon its inner face with several cam-surfaces arranged opposite to the said rack, and upon its outer face, with corresponding spring-chambers arranged concentric with the said surfaces, and also with openings leading from the bottoms of the said chambers to the inner face of the plate; small circular cams interposed between the rack and the said plate in position to co-operate with the said cam-surfaces, a spindle for each cam, extending outward through the said openings into the said spring-chambers, and adapted at its outer end to be engaged for rotation, a nut applied to the outer end of each spindle, and a spring encircling each spindle and bearing at its outer end against the nut thereon, and exerting a constant effort to draw the cam on the inner end of the spindle away from the rack, substantially as described.

In testimony whereof I have signed this specification in the presence of two subscribing witnesses.

AARON WEATHERBY.

Witnesses:
FRED. C. EARLE,
LILLIAN D. KELSEY.